United States Patent [19]

Rathbone et al.

[11] Patent Number: 5,198,927
[45] Date of Patent: Mar. 30, 1993

[54] ADAPTER FOR MICROSCOPE

[75] Inventors: Richard R. Rathbone, Hamden; Stephen C. Wardlaw, Old Saybrook, both of Conn.

[73] Assignee: Yale University, New Haven, Conn.

[21] Appl. No.: 410,163

[22] Filed: Sep. 20, 1989

[51] Int. Cl.$^5$ .................... G02B 21/06; G01N 33/15
[52] U.S. Cl. ...................... 359/385; 359/388; 359/390; 424/7.1
[58] Field of Search ...................... 350/500–529, 350/536, 130, 441, 143, 315–318; 285/81, 90, 92; 362/257, 260; 250/458.1–461.2; 359/885–892, 368–390, 900; 424/7.1, 9; 435/172.2, 240.27, 26, 28, 190, 808; 514/313

[56] References Cited

U.S. PATENT DOCUMENTS

| | | | |
|---|---|---|---|
| 1,837,993 | 3/1930 | Patterson | 350/525 |
| 2,004,806 | 6/1935 | Ellesbad | 359/385 |
| 2,071,408 | 2/1937 | Jones | 350/523 |
| 2,128,394 | 8/1938 | Berek | 359/386 |
| 2,130,493 | 9/1938 | Heine | 350/525 |
| 2,471,879 | 5/1949 | Lowber et al. | 350/527 |
| 3,512,860 | 5/1970 | Hansen et al. | 350/527 |
| 3,846,008 | 11/1974 | Sobajima et al. | 356/171 |
| 3,860,813 | 1/1975 | Herzog et al. | 359/389 |
| 3,918,793 | 11/1975 | Kraft | 359/385 |
| 4,115,802 | 9/1978 | Kramer et al. | 350/508 |
| 4,302,087 | 11/1981 | Reinheimer et al. | 350/502 |
| 4,311,358 | 1/1982 | Gibbons et al. | 359/385 |
| 4,362,355 | 12/1982 | Takahashi | 350/543 |
| 4,379,625 | 4/1983 | Uchiumi et al. | 359/390 |
| 4,617,467 | 10/1986 | Senftle et al. | 350/523 |
| 4,744,642 | 5/1988 | Yoshinaga et al. | 350/518 |
| 4,756,611 | 7/1988 | Yonekubo et al. | 350/527 |
| 4,806,004 | 2/1989 | Wayland | 350/527 |
| 4,897,354 | 1/1990 | Siddiqui | 435/240.27 |

FOREIGN PATENT DOCUMENTS

| | | | |
|---|---|---|---|
| 164680 | 12/1985 | European Pat. Off. | 350/507 |
| 581687 | 8/1933 | Fed. Rep. of Germany . | |
| 5632116 | 8/1979 | Japan | 350/523 |
| 1447166 | 8/1976 | United Kingdom . | |

OTHER PUBLICATIONS

Olympus BHM Series, Metallurgical Microscopes Brochure (3 pgs.).

Primary Examiner—Bruce Y. Arnold
Assistant Examiner—Thong Nguyen
Attorney, Agent, or Firm—Frishauf, Holtz, Goodman & Woodward

[57] ABSTRACT

An adapter which can be easily attached to and detached from the body and objective lens of a conventional microscope to provide fluorescence microscopy capability. The adapter includes (a) a main body which is for mounting between the objective lens and body of a microscope in the axis of the viewed light path, (b) a compact, high intensity light source disposed to a side of the viewed light path which includes a condensing lens and an excitation filter, and (c) a dichroic mirror disposed at the intersection of the radial light path from the light source and the axial viewed light path, the mirror reflects excitation wavelengths, but passes emission wavelengths, and (d) an emission filter disposed between the mirror and the microscope body when the adapter is mounted in a microscope.

16 Claims, 4 Drawing Sheets (PRIOR ART)
FIG. 1

ADAPTER FOR MICROSCOPE

BACKGROUND OF THE INVENTION

1. Field of Invention

The present invention concerns an adapter for an objective lens of a microscope. More particularly, the present invention relates to an adapter which converts an ordinary microscope into a fluorescent microscope.

2. Background Information

Microscopes are described in the following U.S. Pat. Nos. 1,837,993; 3,846,008; 4,362,355 and 4,744,642, the entire contents of such U.S. patents being incorporated by reference herein.

Fluorescence microscopy detects a fluorescent compound to identify microscopic structures. Commonly, the fluorescent compound is attached to an antibody, and the antibody attaches itself to a corresponding antigen on a cell. The cell is then examined under a fluorescence microscope. Fluorescent areas within the cell indicate the presence and location of the antigen.

Although fluorescent microscopy is a very sensitive technique, its use is limited by the expense of the specialized equipment required. Current fluorescent microscopes are designed specifically to provide for fluorescence illumination and filtering. Most use a high pressure mercury vapor lamp as a source of illumination. The lamps themselves are expensive, and they require a complex power supply. The illumination source occupies about as much room as the microscope itself and generates substantial heat. Due to the specialized equipment and complexity, fluorescent microscopes generally cost two to four times the cost of corresponding professional quality bench microscopes. The light source and power also make them more bulky, occupying substantially more bench space than conventional microscopes.

SUMMARY OF THE INVENTION

It is an object of this invention to provide fluorescence microscopy capability to a microscope which was not designed for fluorescence microscopy.

It is a further object of this invention to provide this capability in the form of a user installable attachment.

It is another object of this invention to provide an attachment which can be installed on the majority of professional quality microscopes.

It is a further object of this invention to provide an adapter for a microscope that can be easily attached and detached from the microscope.

It is still another object of the present invention to provide a microscope adapter which can be utilized on conventional microscopes to provide sufficient fluorescence microscopy to inexpensively and efficiently detect infectious diseases, for example, malaria.

The above objects, as well as other objects, aims and advantages are satisfied by the present invention.

The present invention concerns an adapter which can be attached (so that it can be readily detached) between the objective lens and the body of a microscope, which allows the microscope to be used for fluorescence examination. Professional quality microscopes in common use have removable objective lenses with standard threads. The focusing mechanism of such microscopes allows for the mounting threads for the objective lens (or lenses) to be moved away from the stage to make room for the inventive adapter.

The present invention concerns an adapter to be coupled to an objective lens of a microscope comprising a body member having a first (detachable) coupling means at one end thereof to receive an objective lens of a microscope and having a second (detachable) coupling means at the other end thereof to receive a microscope component. The body member has an axial light path running longitudinally therethrough and has a radial light path which intersects the axial light path. A source of light is disposed in the radial light path of the body member.

A first filtering means is disposed in the radial light path of the body member, downstream of the source of light, for passing light at wavelengths which excite fluorescence in a specimen to be examined in a microscope and to remove light at wavelengths where visible fluorescence emission occurs in the specimen.

A reflecting means is disposed in the intersection of the axial light path and radial light path. The reflecting means passes light through the axial light path and reflects light at excitation wavelengths, but does not reflect light at emission wavelengths.

A second filtering means is disposed in the axial light path and is disposed above the reflecting means adjacent the second coupling means (the second filtering means is disposed between the reflecting means and the eye piece of a microscope in which the adapter is installed, i.e., the second filtering means is disposed between the reflecting means and the observer's eye). The second filtering means blocks excitation wavelengths which pass through the reflecting means.

The present invention also concerns a combination of an adapter as described above and a microscope. The microscope comprises a vertical body tube, an eye piece disposed at one end of the body tube, an objective lens disposed at the other end of the body tube and a means for retaining a specimen plate under the objective lens. The adapter is coupled to the body tube and to the objective lens of the microscope. Preferably the adapter is detachably coupled to the body tube. Preferably the turret is detachably coupled to the objective lens. The adapter is aligned so as to form a longitudinal axial light path through the body tube, the adapter and the objective lens.

The adapter for the aforesaid combination comprises a body member having a first coupling means at one end thereof to receive the objective lens and has a second coupling means at the other end thereof to receive the body tube. The body member has an axial light path running longitudinally therethrough and has a radial light path which intersects the axial light path. A source of light is disposed in the radial light path.

A first filtering means is disposed in the radial light path, downstream of the source of light, for passing light at wavelengths which excite fluorescence in a specimen to be examined in the microscope and to remove light at wavelengths where visible fluorescence emission occurs in the specimen.

A reflecting means is disposed in the intersection of the axial light path and radial light path. The reflecting means passes light through the axial light path and reflects light at excitation wavelengths, but does not reflect light at emission wavelengths.

A second filtering means is disposed in the axial light path and is disposed between the reflecting means and the eye piece. The second filtering means blocks excitation wavelengths which pass through the reflecting means.

The present invention is particularly useful as a relatively inexpensive means for detecting infectious diseases, such as tropical diseases and particularly malaria, which detection does not require the high resolution afforded by expensive fluorescent microscopes. Accordingly, in third world countries where the cost of fluorescent microscopes are prohibitive, the present invention would serve to provide medical personnel with a relatively inexpensive adapter which can be utilized in a conventional microscope in order to detect infectious diseases, such as malaria in a specimen of a patient. The invention can also be used to detect other blood borne parasites, for example, filariasis and heartworm in dogs. Still further, the invention can be employed in immunohistochemical procedures. By immunohistochemical is meant a procedure where an antibody, for example, is attached to a cell or tissue, and is tagged with a fluorescent moiety and the invention can be used to detect the point of attachment. One example of such procedure is to detect an anti-nuclear antibody which is tagged with fluorescein.

DESCRIPTION OF THE DRAWINGS

For the purposes of illustrating the invention there is shown in the drawings forms which are presently preferred. It is to be understood, however, that the present invention is not limited to the precise arrangements and instrumentalities depicted in the drawings.

DETAILED DESCRIPTION OF PREFERRED EMBODIMENTS

Figure 1:
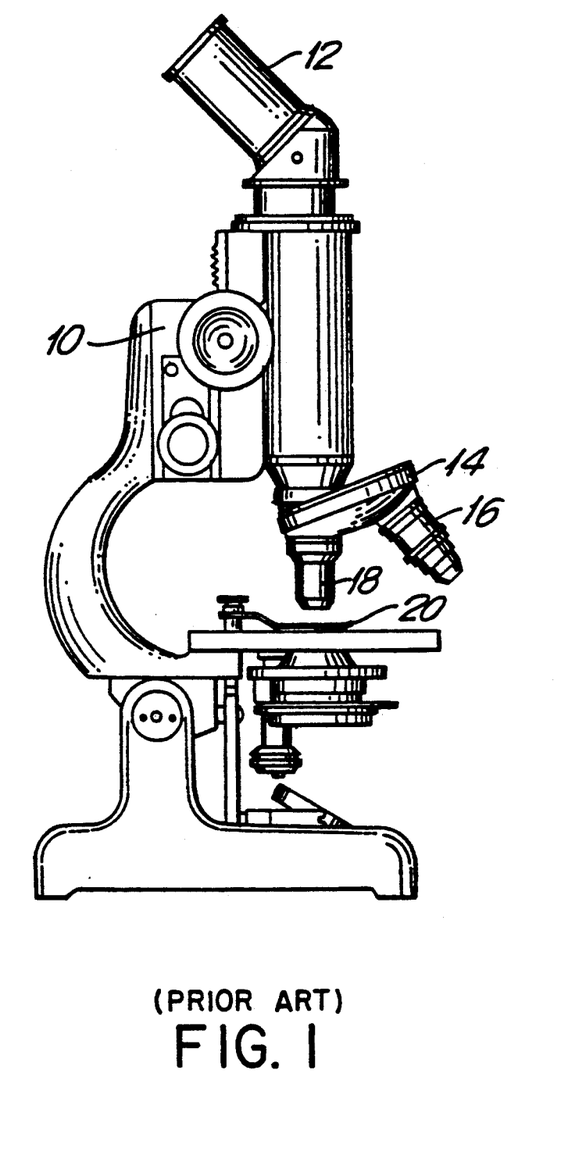
FIG. 1 depicts a side elevational view of a conventional microscope wherein the inventive adapter can be employed.

Referring to the drawings, in which like parts are designated by like reference numerals, FIG. 1 depicts a conventional microscope 10 in which an inventive adapter can be utilized. Microscope 10 has eye piece 12, turret 14, objective lens 16, objective lens 18 and specimen holder 20.

Figure 2:
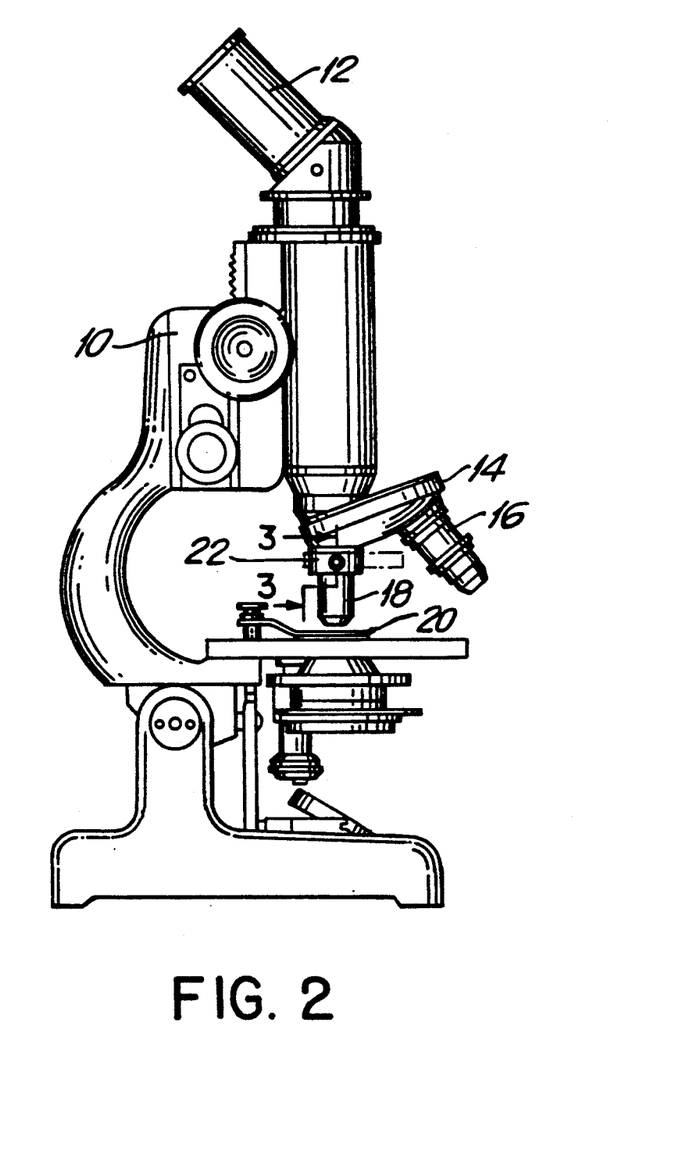
FIG. 2 is a side elevational view of a conventional microscope as depicted in FIG. 1 and having installed therein an adapter according to the present invention.

A preferred microscope adapter 22 of the invention is depicted in FIG. 2. The adapter 22 is installed in a microscope 10 between objective lens 18 and turret 14.

Figure 3:
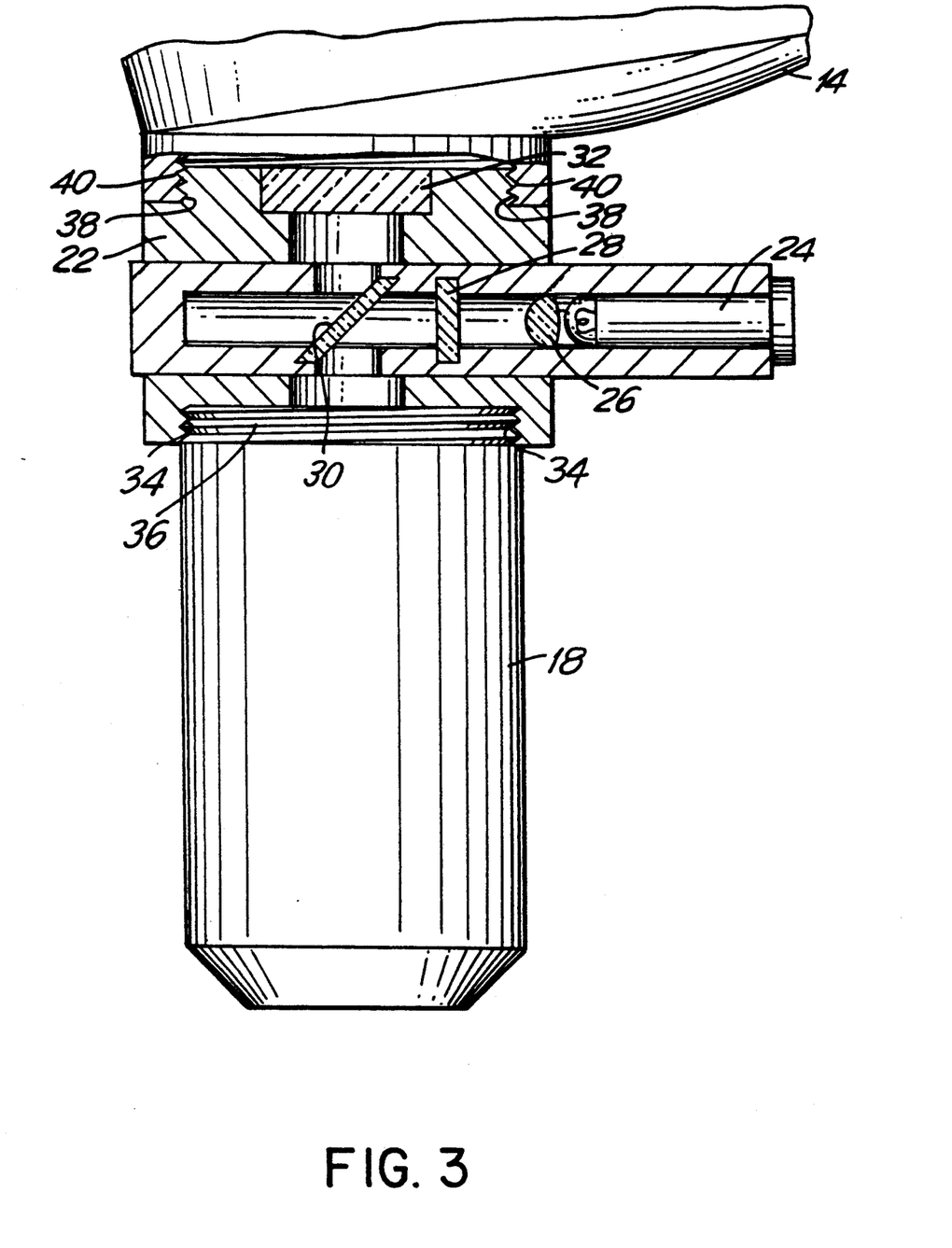
FIG. 3 is an elevational view of a portion of the microscope and adapter as depicted in FIG. 2 and containing a partial cross-sectional view taken along line 3-3 in FIG. 2.

The adapter 22 is depicted in greater detail in FIG. 3.

The light source for microscope adapter 22 includes a quartz-halogen lamp 24 and a condensing lens 26. Non-limiting examples of other lamps that can be employed are a vacuum tungsten lamp or a mercury lamp. Light from this source is filtered by an excitation filter 28 so as to pass light at wavelengths (for example, 490 nm and below) which excite fluorescence in the specimen to be examined, typically in the violet region, and to remove light at wavelengths (for example, 510 nm and above) where visible fluorescence emission occurs in the specimen, typically green, yellow or red regions.

The filtered excitation light is then reflected by a dichroic mirror 30 onto the objective lens 18 of the microscope, which focuses the excitation light onto the specimen. The dichroic mirror 30 reflects the majority of light (preferably reflects 80% and greater and more particularly, reflects 90% or greater) at the excitation wavelengths, but does not reflect light at emission wavelengths. A partially reflective mirror (beam splitter) could be used, but it is substantially less efficient. A beam splitter typically reflects and transmits about 50% of light.

Fluorescent light emitted by the specimen is focused by the objective lens 18, and passes through the mirror 30 eventually to the eye piece (see item 12 in FIG. 2). An emission filter 32 which passes emission wavelengths and blocks excitation wavelengths is placed in the light path between the mirror 30 and the observer to block any reflections of the excitation beam from the specimen or the surrounding optics. It is convenient to place this emission filter 32 just above the dichroic mirror 30, i.e., the emission filter 32 is disposed between the dichroic mirror 30 and the eye piece of a microscope in which the adapter is installed. As depicted in FIG. 3, emission filter 32 is adjacent to screw threads 38.

Figure 4:
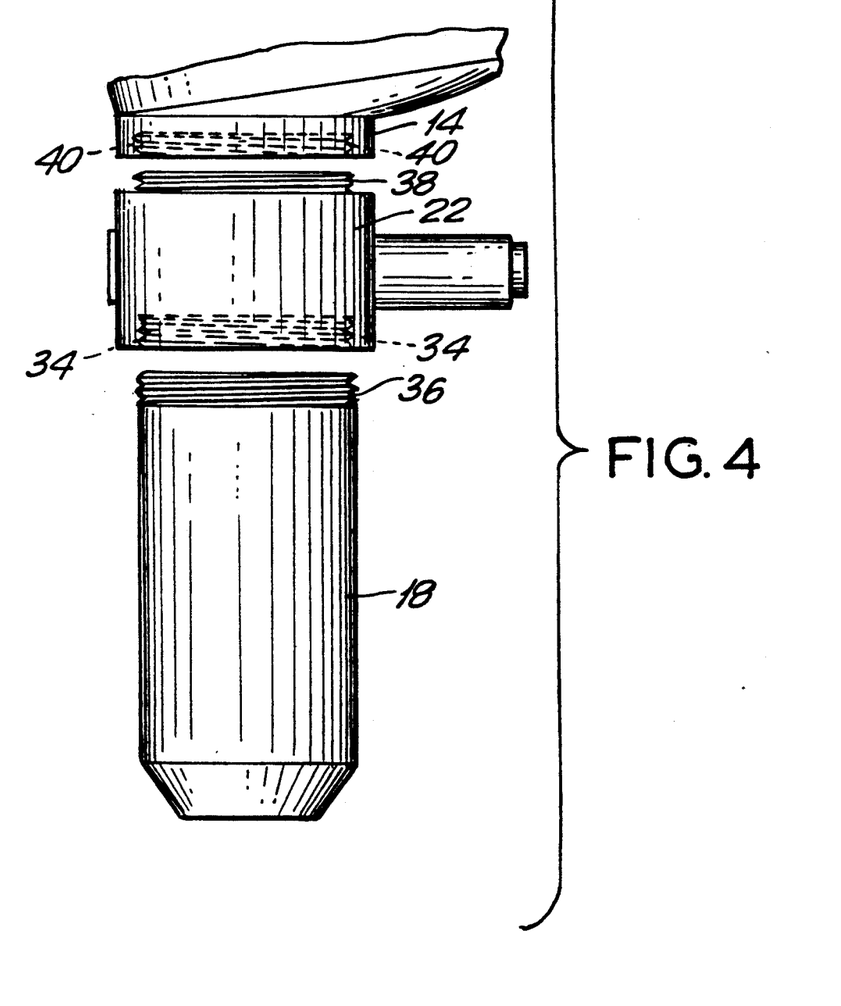
FIG. 4 is an elevational view of a microscope adapter as depicted in FIG. 2 and FIG. 3 in a detached state from a turret and an objective lens of a microscope as depicted in FIGS. 2 and 3.

Screw threads 34 permit the adapter 22 to be screw thread connected directly to the screw threads 36 of the objective lens 18 of the microscope. Screw threads 38 of adapter 22 permit the adapter 22 to be screw thread connected directly to the screw threads 40 of the turret 14 of the microscope.

Although screw threads are the preferred means to connect the adapter 22 to the microscope 10, it is to be understood that other mechanical coupling means can be employed, for example, friction fit coupling or bayonet coupling.

It will be appreciated that the instant specification is set forth by way of illustration and not limitation, and that various modifications and changes may be made without departing from the spirit and scope of the present invention.

What is claimed is:

1. A method of adapting a conventional, non-fluorescent microscope into a fluorescent microscope, said conventional microscope comprising a vertical body tube, an eye piece disposed at one end of said body tube, an objective lens disposed at another end of said body tube, and a means for retaining a specimen plate under said objective lens, the method comprising the steps of:

(a) providing an adapter comprising:

a body member having a first coupling means at one end thereof for detachably coupling directly to said objective lens and having a second coupling means at another end thereof for detachably coupling directly to said body tube, said body member having an axial light path running longitudinally therethrough and having a radial light path which intersects the axial light path;

a source of light disposed in the radial light path;

a first filtering means disposed in the radial light path, downstream of the source of light, for passing light at wavelengths which excite fluorescence in a specimen to be examined in the microscope and for blocking light at wavelengths where visible fluorescence emission occurs in the specimen;

a reflecting means disposed at the intersection of the axial light path and radial light path, the reflecting means passing light through the axial light path and reflecting light at excitation wavelengths; and a second filtering means disposed in the axial light path and disposed between the reflecting means and the eye piece, the second filtering means blocking light at excitation wavelengths which pass through the reflecting means;

(b) attaching said first coupling means to said objective lens of said microscope; and (c) attaching said second coupling means to said body tube of said microscope, whereby said body member of said adapter is interposed directly between said objective lens and the body tube and the axial light path passing through said body member is in alignment with a light passing through the objective lens and passing through the body tube.

2. The method according to claim 1, wherein the light source comprises a quartz halogen lamp and a condensing lens.

3. The method according to claim 1, wherein the first and second coupling means comprise screw threads; the reflecting means is a dichroic mirror; and the first filtering means pass light at 490 nm and below and remove light at 510 nm and above.

4. A method for detecting malaria comprising the steps of:

(a) contacting a sample suspected of containing malaria with an antibody for attaching to an antigen in the sample, the antibody being labelled with a fluorescent compound, (b) disposing said sample on a specimen plate of a convention a, non-fluorescent microscope having an objective lens and a turret;

(c) providing an adapter, said adapter comprising:
a body member having a first coupling means at one end thereof for detachably coupling directly to the objective lens of the microscope and having a second coupling means at another end thereof for detachably coupling directly to the turret, said body member having an axial light path running longitudinally therethrough and having a radial light path which intersects the axial light path;

a source of light disposed in the radial light path;

a first filtering means disposed in the radial light path, downstream of the source of light, for passing light at wavelengths which excite fluorescence in the specimen to be examined in the microscope and for blocking light at wavelengths where visible fluorescence emission occurs in the specimen;

a reflecting means disposed at the intersection of the axial light path and radial light path, the reflecting means passing light through the axial light path and reflecting light at excitation wavelengths, but not reflecting light at emission wavelengths; and a second filtering means disposed in the axial light path and disposed above the reflecting means adjacent the second coupling means, the second filtering means blocking light at excitation wavelengths which pass through the reflecting means;

(d) attaching said first coupling means to said objective lens of said microscope and attaching said second coupling means to said turret, whereby said body member is interposed directly between the objective lens and the turret and the axial light path passing through the body member is in alignment with a light path passing through the objective lens and passing through the turret; and (e) examining the ample with said microscope having coupled thereto said adapter to detect fluorescent areas within the sample as an indication of the presence of the antigen.

5. The method according to claim 4, wherein the light source comprises a quartz halogen lamp and a condensing lens.

6. The method according to claim 4, wherein the first and second coupling means comprise screw threads; the reflecting means is a dichroic mirror; and the first filtering means pass light at 490 nm and below and remove light at 510 nm and above.

7. A method for conducting an immunohistochemical procedure comprising the steps of:

(a) disposing a sample labelled with a fluorescent moiety on a specimen plate of a conventional, non-fluorescent microscope having a objective lens and a turret;

(b) providing an adapter, said adapter comprising:
a body member having a first coupling means at one end thereof for detachably coupling directly to the objective lens of the microscope and having a second coupling means at another end thereof for detachably coupling directly to the turret, said body member having an axial light path running longitudinally therethrough and having a radial light path which intersects the axial light path;

a first filtering means disposed in the radial light path, downstream of the source of light, for passing light at wavelengths which excite fluorescence in a specimen to be examined in a microscope and for blocking light at wavelengths where visible fluorescence emission occurs in the specimen;

a reflecting means disposed at the intersection of the axial light path and radial light path, the reflecting means passing light through the axial light path and reflecting light at excitation wavelengths, but not reflecting light at emission wavelengths; and a second filtering means disposed in the axial light path and disposed above the reflecting means adjacent the second coupling means, the second filtering means blocking light at excitation wavelengths which pass through the reflecting means;

(c) attaching said first coupling means to said objective lens of aid microscope and attaching said second coupling means to said turret, whereby said body member is interposed directly between the objective lens and the turret and the axial light path passing through the body member is in alignment with a light path passing through the objective lens and passing through the turret; and (d) examining the sample with said microscope having coupled thereto said adapter to detect fluorescence.

8. The method according to claim 7, wherein the light source comprises a quartz halogen lamp and a condensing lens.

9. The method according to claim 7, wherein the first and second coupling means comprise screw threads; the reflecting means is a dichroic mirror; and the first filtering means pass light at 490 nm and below and remove light at 510 nm and above.

10. The method according to claim 7, wherein the sample si suspected of containing an antibody attached to a cell or tissue and the label with fluorescein whereby to detect a point of attachment.

11. A method for detecting filariasis comprising the steps of:

(a) labelling a sample suspected of containing filariasis with a fluorescent compound;

(b) disposing the labelled sample on a specimen plate of a conventional, on-fluorescent microscope having an objective lens and a turret;

(c) providing an adapter, said adapter comprising:

a body member having a first coupling mean sat one end thereof for detachably coupling directly to said objective lens of the microscope and having a second coupling means at another end thereof for detachably coupling directly to the turret, said body member having an axial light path running longitudinally therethrough and having a radial light path which intersects the axial light path;

a first filtering means disposed in the radial light path, downstream of the source of light, for passing light at wavelengths which excite fluorescence in a specimen to be examined int he microscope and for blocking light at wavelengths where visible fluorescence emission occurs in the specimen;

a reflecting means disposed at the intersection of the axial light path and radial light path, the reflecting means passing light through the axial light path and reflecting light at excitation wavelengths; and a second filtering means disposed in the axial light path and disposed above the reflecting means adjacent the second coupling means, the second filtering means blocking light at excitation wavelengths which pass through the reflecting means;

(d) attaching said first coupling means to said objective lens of said microscope and attaching said second coupling means to said turret, whereby said body member is interposed directly between the objective lens and the turret and the axial light path passing through the body member is in alignment with a light path passing through the objective lens and passing through the turrets and (e) examining the sample with said microscope having coupled thereto said adapter to detect fluorescence.

12. The method according to claim 11, wherein the light source comprises a quartz halogen lamp and a condensing lens.

13. The method according to claim 11, wherein the first and second coupling means comprise screw threads; the reflecting means is a dichroic mirror; and the first filtering means pass light at 490 nm and below and remove light at 510 nm and above.

14. A method for detecting heartworm comprising the steps of:

(a) labelling a sample suspected of containing heartworm with a fluorescent compound;

(b) disposing the labelled sample on a specimen plate of a conventional, non-fluorescent microscope having an objective lens and a turret;

(c) providing an adapter, said adapter comprising:

a body member having a first coupling means at one end thereof for detachably coupling directly to said objective lens of the microscope and having a second coupling means at another end thereof for detachably coupling directly to the turret, said body member having an axial light path running longitudinally therethrough and having a radial light path which intersects the axial light path;

a source of light disposed in the radial light path;

a first filtering means disposed in the radial light path, downstream of the source of light, for passing light at wavelengths which excite fluorescence in a specimen to be examined in the microscope and for blocking light at wavelengths where visible fluorescence emission occurs in the specimen;

a reflecting means disposed at the intersection of the axial light path and radial light path, the reflecting means passing light through the axial light path and reflecting light at excitation wavelengths; and a second filtering means disposed in the axial light path and disposed above the reflecting means adjacent the second coupling means, the second filtering means blocking light at excitation wavelengths which pass through the reflecting means;

(d) attaching said first coupling means to said objective lens of said microscope and attaching said second coupling mans to said turret, whereby said body member is interposed directly between the objective lens and the turret and the axial light path passing through the body member is in alignment with a light path passing through the objective lens and passing through the turrets and (e) examining the sample with said microscope having coupled thereto said adapter to detect fluorescence.

15. The method according to claim 14, wherein the light source comprises a quartz halogen lamp and a condensing lens.

16. The method according to claim 14, wherein the first and second coupling means comprise screw threads; the reflecting means is a dichroic mirror; and the first filtering means pass light at 490 nm and below and remove light at 510 nm and above.

* * * * *

UNITED STATES PATENT AND TRADEMARK OFFICE
CERTIFICATE OF CORRECTION

PATENT NO. : 5,198,927

DATED : March 30, 1993

INVENTOR(S) : Richard R. RATHBONE et al

It is certified that error appears in the above-identified patent and that said Letters Patent is hereby corrected as shown below:

Title Page, [56] References Cited: U.S. Patent Documents:
insert --4,616,133  10/1986          Senftle    359/385--

Col. 5, line 21, before "490 nm" insert --wavelengths of--.
Col. 5, line 21, replace "below" with --shorter--.
Col. 5, line 22, before "510 nm" insert --wavelengths of--.
Col. 5, line 22, replace "above" with --longer--.

Col. 6, line 9, before "490 nm" insert --wavelengths of--.
Col. 6, line 9, replace "below" with --shorter--.
Col. 6, line 10, before "510 nm" insert --wavelengths of--.
Col. 6, line 10, replace "above" with --longer--.

Col. 6, line 59, before "490 nm" insert --wavelengths of--.
Col. 6, line 59, replace "below" with --shorter--.
Col. 6, line 60, before "510 nm" insert --wavelengths of--.
Col. 6, line 60, replace "above" with --longer--.

UNITED STATES PATENT AND TRADEMARK OFFICE
CERTIFICATE OF CORRECTION

PATENT NO. : 5,198,927

DATED : March 30, 1993

INVENTOR(S) : Richard L. RATHBONE et al

It is certified that error appears in the above-identified patent and that said Letters Patent is hereby corrected as shown below:

```
Col. 7, line 47, before "490 nm" insert --wavelengths of--.
Col. 7, line 47, replace "below" with --shorter--.
Col. 7, line 48, before "510 nm" insert --wavelengths of--.
Col. 7, line 48, replace "above" with --longer--.

Col. 8, line 48, before "490 nm" insert --wavelengths of--.
Col. 8, line 48, replace "below" with --shorter--.
Col. 8, line 49, before "510 nm" insert --wavelengths of--.
Col. 8, line 49, replace "above" with --longer--.
```

Signed and Sealed this

Sixteenth Day of August, 1994

*Attest:*

BRUCE LEHMAN

*Attesting Officer*   *Commissioner of Patents and Trademarks*